United States Patent
Waskie et al.

(10) Patent No.: US 9,738,148 B1
(45) Date of Patent: Aug. 22, 2017

(54) STUD ASSEMBLY

(71) Applicant: GM GLOBAL TECHNOLOGY OPERATIONS LLC, Detroit, MI (US)

(72) Inventors: David B. Waskie, Farmington Hills, MI (US); Jason M. Miller, St. Clair Shores, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 0 days.

(21) Appl. No.: 15/045,940

(22) Filed: Feb. 17, 2016

(51) Int. Cl.
*F02B 77/00* (2006.01)
*B60K 5/12* (2006.01)

(52) U.S. Cl.
CPC ............ *B60K 5/1275* (2013.01); *F02B 77/00* (2013.01)

(58) Field of Classification Search
CPC ........ F16B 21/07; F16B 21/071; F16B 21/08; F16B 21/082; F16B 21/084; F16B 21/086; B60K 5/1275; F02F 7/00; F02F 7/0021; F02F 7/0065; F02F 7/0082; F02F 2007/0041; F02B 77/02; B60R 13/0838; B60R 2021/0004; B62D 21/15; B62D 21/152
USPC ................ 180/232, 274; 292/59; 123/195 C, 123/198 E; 411/107
See application file for complete search history.

(56) References Cited

U.S. PATENT DOCUMENTS

| | | | | | |
|---|---|---|---|---|---|
| 2,286,739 | A | * | 6/1942 | Krause | E05B 83/24 292/341.19 |
| 3,415,086 | A | * | 12/1968 | Trainor | E05B 83/24 70/161 |
| 3,585,824 | A | * | 6/1971 | Schenk | F16B 5/10 411/555 |
| 5,094,579 | A | * | 3/1992 | Johnson | F02B 77/00 411/107 |
| 5,595,256 | A | * | 1/1997 | Mueller | B21D 53/88 180/232 |
| 5,706,908 | A | * | 1/1998 | Sakai | B60R 13/0838 180/232 |
| 6,394,211 | B1 | * | 5/2002 | Palenchar | B62D 25/10 180/69.21 |
| 7,144,039 | B2 | * | 12/2006 | Kawasaki | B60K 1/04 180/232 |
| 7,244,085 | B2 | * | 7/2007 | Dobson | H02G 3/083 16/2.1 |
| 7,293,624 | B2 | * | 11/2007 | Adachi | B60R 21/38 180/274 |

(Continued)

*Primary Examiner* — J. Allen Shriver, II
*Assistant Examiner* — Brian Cassidy
(74) *Attorney, Agent, or Firm* — Quinn IP Law

(57) ABSTRACT

A stud assembly is coupled between an underhood propulsion system and an underhood cover in order to manage energy from an external force applied to the underhood cover. The underhood cover is coupled over the underhood propulsion system. The stud assembly is coupled between the underhood propulsion system and the underhood cover and includes a polymeric isolator and a stud coupled to the polymeric isolator. The stud includes a shank and a head coupled to the shank. The head is coupled to the polymeric isolator. The stud assembly includes a boss coupled to the underhood cover. The boss is disposed adjacent the polymeric isolator. The shank includes a bending initiator feature in order to allow the shank to bend when the underhood cover is subjected to an external force.

14 Claims, 3 Drawing Sheets

(56) References Cited

U.S. PATENT DOCUMENTS

| | | | | |
|---|---|---|---|---|
| 8,221,043 B2* | 7/2012 | Guyton | ............... | F16B 1/0014 |
| | | | | 411/432 |
| 8,231,149 B1* | 7/2012 | Shelby | ............... | E05B 83/243 |
| | | | | 292/202 |
| 9,394,004 B2* | 7/2016 | Gotou | ............... | B60K 1/00 |
| 9,421,865 B2* | 8/2016 | Bernardi | ............ | B60K 5/1275 |
| 2003/0209380 A1* | 11/2003 | Anzai | ............... | B60K 5/1275 |
| | | | | 180/312 |
| 2004/0130078 A1* | 7/2004 | Huber | ............... | B60K 5/1275 |
| | | | | 267/4 |
| 2006/0219860 A1* | 10/2006 | Greenwood | ........ | B60R 13/0869 |
| | | | | 248/560 |
| 2007/0287001 A1* | 12/2007 | Carlson | ............. | B60R 13/0838 |
| | | | | 428/304.4 |
| 2008/0029942 A1* | 2/2008 | Kern | ............... | F16F 13/1409 |
| | | | | 267/140.13 |
| 2012/0211297 A1* | 8/2012 | Ralston | ............. | B60R 21/34 |
| | | | | 180/274 |
| 2013/0174389 A1* | 7/2013 | Dole | ............... | B60R 13/0206 |
| | | | | 24/458 |
| 2013/0320181 A1* | 12/2013 | Kamei | ............... | B60K 5/1241 |
| | | | | 248/548 |
| 2015/0267609 A1* | 9/2015 | Lohr | ............... | F02B 77/02 |
| | | | | 123/198 E |
| 2015/0283901 A1* | 10/2015 | Bernardi | ............ | B60K 5/1275 |
| | | | | 180/232 |
| 2015/0369269 A1* | 12/2015 | Holt | ............... | F16B 5/0241 |
| | | | | 411/108 |
| 2016/0023682 A1* | 1/2016 | Muehlhausen | ...... | B60K 5/1275 |
| | | | | 296/187.09 |
| 2016/0341235 A1* | 11/2016 | Heimann | ............ | F16B 21/09 |

* cited by examiner

STUD ASSEMBLY

TECHNICAL FIELD

The present disclosure relates to a stud assembly configured to manage and absorb energy originating from an external force applied to an underhood cover.

BACKGROUND

Vehicles may sometimes be subjected to external forces. If an external force is exerted on the vehicle, some vehicles components may manage and/or absorb the energy of that external force.

SUMMARY

The presently disclosed stud assembly can be coupled between an underhood propulsion system and an underhood cover in order to absorb energy from an external force applied to the underhood cover. As non-limiting examples, the underhood propulsion system may be an internal combustion engine, an electric motor/generator, or any other suitable system capable of propelling a vehicle. As non-limiting examples, the underhood cover may be an appearance cover, an acoustic cover, or a thermal shield. In an embodiment, the stud assembly is part of a propulsion assembly including an underhood propulsion system and an underhood cover. The underhood cover is coupled over the underhood propulsion system. The stud assembly is coupled between the underhood propulsion system and the underhood cover and includes a polymeric isolator and a stud coupled to the polymeric isolator. The stud includes a shank and a head coupled to the shank. The head is coupled to the polymeric isolator. The stud assembly further includes a boss coupled to the underhood cover. The boss is disposed adjacent the polymeric isolator in order to allow energy transfer from the underhood cover to the polymeric isolator through the boss when the underhood cover is subjected to an external force. The shank includes at least one bending initiator feature in order to allow the shank to bend when the underhood cover is subjected to the external force.

The above features and advantages and other features and advantages of the present teachings are readily apparent from the following detailed description of the best modes for carrying out the teachings when taken in connection with the accompanying drawings.

DETAILED DESCRIPTION

Figure 1:
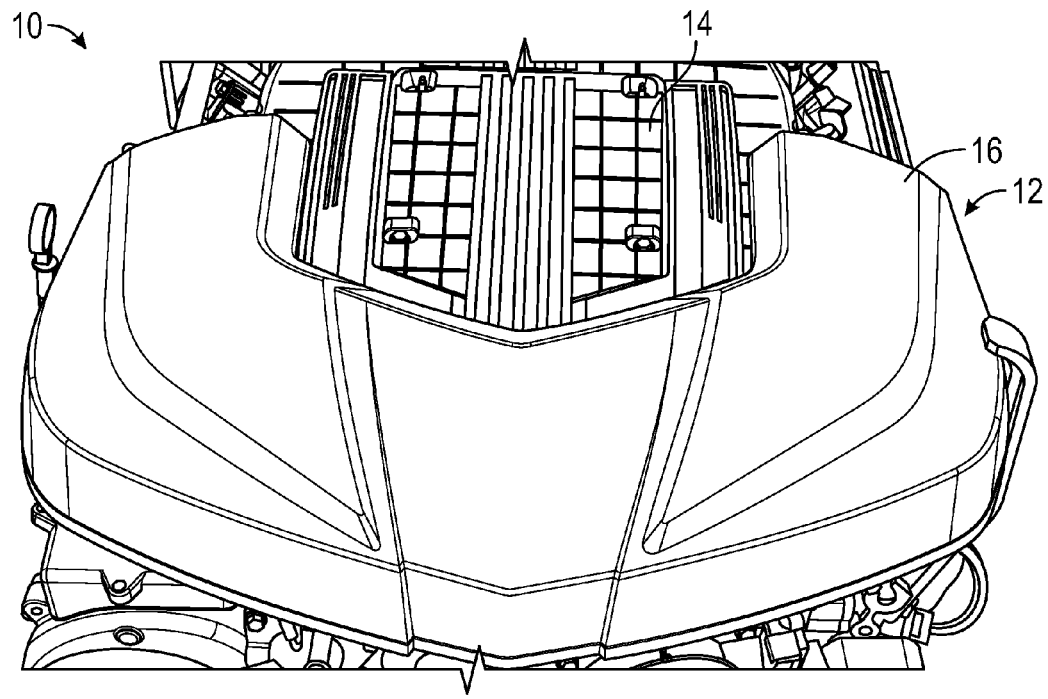
FIG. 1 is a perspective, fragmentary view of a vehicle including an underhood propulsion system and an underhood cover.
Figure 2:
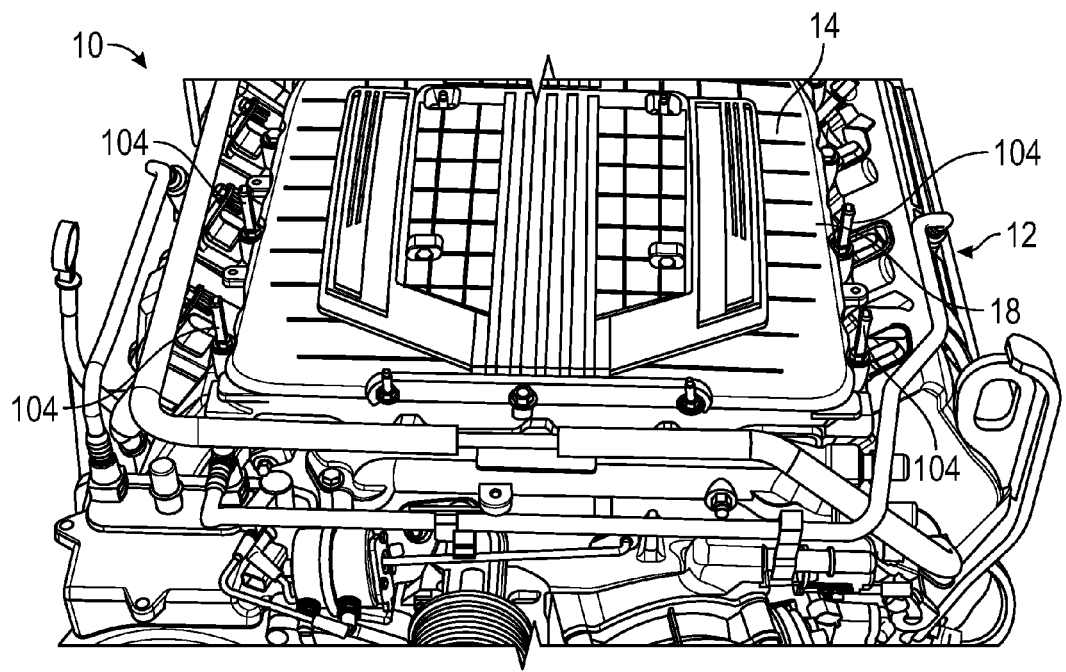
FIG. 2 is a perspective, fragmentary view of the vehicle shown in FIG. 1 without the underhood cover.

Referring to the drawings, wherein like reference numbers correspond to like or similar components throughout the several figures, and beginning with FIGS. 1 and 2. A vehicle 10 includes a propulsion assembly 12 for propulsion. The propulsion assembly 12 includes an underhood propulsion system 14 and an underhood cover 16 disposed over the underhood propulsion system 14. As non-limiting examples, the underhood propulsion system 14 may be an internal combustion engine, an electric motor/generator, or any other suitable system capable of propelling a vehicle. As non-limiting examples, the underhood cover 16 may be an appearance cover, an acoustic cover, or a thermal shield. In particular, the underhood propulsion system 14 has a top surface 18 (FIG. 2), and the underhood cover 16 is coupled to the underhood propulsion system 14. As such, the underhood cover 16 covers at least part of the top surface 18 in order to protect the underhood propulsion system 14.

With reference to FIGS. 2-5, the propulsion assembly 12 further includes at least one stud assembly 100 for managing energy transfer when the underhood cover 16 is subjected to an external force F. When the underhood cover 16 is subjected to the external force F, it is desirable to manage and/or absorb the energy from the external force F. To this end, the presently disclosed stud assembly 100 is coupled between the underhood cover 16 and the underhood propulsion system 14 in order to manage and/or absorb energy when the underhood cover 16 is subjected to the external force F. It is contemplated that the propulsion assembly 12 may include a plurality of stud assemblies 100. For example, in the depicted embodiment, four stud assemblies 100 are coupled between the underhood cover 16 and the underhood propulsion system 14. Regardless of the quantity, each stud assembly 100 includes a polymeric isolator 102 and a stud 104 coupled to the polymeric isolator 102. Each stud 104 is directly coupled to the underhood propulsion system 14 and protrudes from the top surface 18 toward the underhood cover 16, as shown in FIG. 2. Thus, each stud 104 protrudes away from the top surface 18.

The underhood cover 16 includes a first panel 20, such as a top panel, and a second panel 22, such as a side panel, coupled to the first panel 20. It is contemplated, however, that the underhood cover 16 does not necessarily include the second panel 22. The underhood cover 16 defines an inner cover cavity 26. The polymeric isolator 102 serves as a vibration and thermal insulator and is at least partially disposed in the inner cover cavity 26 to facilitate energy transfer between the underhood cover 16 and the stud assembly 100. Specifically, the majority of the polymeric isolator 102 is disposed in the inner cover cavity 26 to facilitate energy transfer between the underhood cover 16 and the stud assembly 100. In addition to the polymeric isolator 102, the stud assembly 100 includes a boss 106 at least partially disposed in the inner cover cavity 26. The boss 106 is coupled to the underhood cover 16 and is disposed adjacent the polymeric isolator 102 in order to allow energy transfer from the underhood cover 16 to the polymeric isolator 102 when the underhood cover 16 is subjected to the external force F. Specifically, when the underhood cover 16 is subjected to the external force F, the underhood cover 16 deforms, causing the boss 106 to move toward (and contact) the polymeric isolator 102. As a consequence, the boss 106 pushes the polymeric isolator 102 and, in turn, the stud 104 deforms, thereby absorbing energy from the external force F. It is contemplated that the deformation of the stud 104, when the underhood cover 16 receives the external force F, may lead to fracture. This fracture also facilitates the energy transfer and/or absorption by the stud assembly 100 when the underhood cover 16 is subjected to the external force F. To facilitate the deformation and/or fracture, the stud 104 may have one or more bending initiator features 107, such as perforations 108, as discussed in detail below.

The polymeric isolator 102 isolates the underhood cover 16 from the underhood propulsion system 14 (FIG. 2) when the underhood cover 16 is subjected to the external force F. To this end, the polymeric isolator 102 is wholly or partly made of a suitable polymeric material, such as natural or synthetic rubber, in order to effectively manage and/or absorb energy from the external force F and isolate the underhood cover 16 from underhood propulsion system 14. In addition, the polymeric isolator 102 facilitates energy transfer from the boss 106 to the stud 104 when the underhood cover 16 receives the external force F. To this end, the polymeric isolator 102 has an isolator body 103 having a substantially frustoconical shape. The polymeric isolator 102 is substantially hollow and therefore defines an inner isolator cavity 110 extending into the isolator body 103. The inner isolator cavity 110 is configured, shaped, and sized to receive a portion of the stud 104 in order to couple the stud 104 to the polymeric isolator 102. The inner isolator cavity 110 includes a first or insertion cavity portion 112 and a second or coupling cavity portion 114. The first cavity portion 112 is larger than the second cavity portion 114 in order to facilitate insertion of the stud 104 into the inner isolator cavity 110. The second cavity portion 114 is smaller than the first cavity portion 112 such that the stud 104 can be coupled to the polymeric isolator 102 after it has been inserted through the first cavity portion 112.

The polymeric isolator 102 can be coupled to the underhood cover 16 through a snap-fit arrangement or any other suitable coupling arrangement. As a non-limiting example, the underhood cover 16 includes at least one snap-fit protrusion 24 configured to be securely received in snap-fit recess 116 of the polymeric isolator 102. In particular, each of the snap-fit protrusions 24 and the snap-fit recesses 116 may have an annular shape in order to facilitate the connection between the polymeric isolator 102 and the underhood cover 16. The snap-fit protrusion 24 may extend from a support wall 28 of the underhood cover 16. In the depicted embodiment, the support wall 28 directly interconnects the first panel 20 and the second panel 22 in order to enhance the structural stability of the underhood cover 16.

As discussed above, the boss 106 is disposed in the inner cover cavity 26 and may be directly coupled to the support wall 28 in order to enhance the structural stability of the underhood cover 16. The boss 106 may also be directly coupled to the first panel 20 of the underhood cover 16. As a non-limiting example, the boss 106 may be molded with the underhood cover 16 and may be wholly or partly made of a polymeric material that is sufficiently stiff to bend the stud 104 when the underhood cover 16 is subjected to the external force F. Further, the boss 106 has an elongated shape and is obliquely angled relative to the support wall 28 of the underhood cover 16 to maximize energy transfer between the underhood cover 16 and the stud 104. As a non-limiting example, the oblique angle θ defined between the boss 106 and the support wall 28 is about one-hundred twenty seven (127) degrees such that the boss 106 is perpendicular to the external force F, thereby maximizing energy transfer between the underhood cover 16 and the stud 104 when the underhood cover 16 is subjected to the external force F.

Aside from being elongated, the boss 106 is shaped as a knife blade in order to transfer sufficient energy from the underhood cover 16 to the polymeric isolator 102 in order to bend the stud 104 when the underhood cover 16 receives the external force F. Specifically, the boss 106 includes a first boss portion 118 and a second boss portion 120 coupled to the underhood cover 16 only through the first boss portion 118. The second boss portion 120 is therefore farther from the first panel 20 than the first boss portion 118. In order to focus and maximize the energy transfer from the underhood cover 16 to the polymeric isolator 102, the width W1 of the first boss portion 118 is less than the width W2 of the second boss portion 120.

Figure 6:
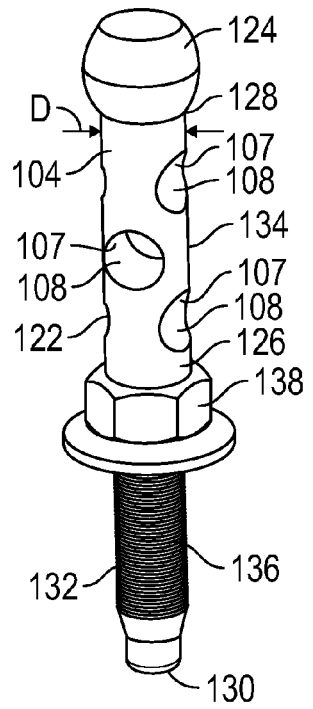
FIG. 6 is a perspective view of a stud of the stud assembly shown in FIG. 3, wherein the stud is not subjected to an external force and is in an original state.
Figure 7:
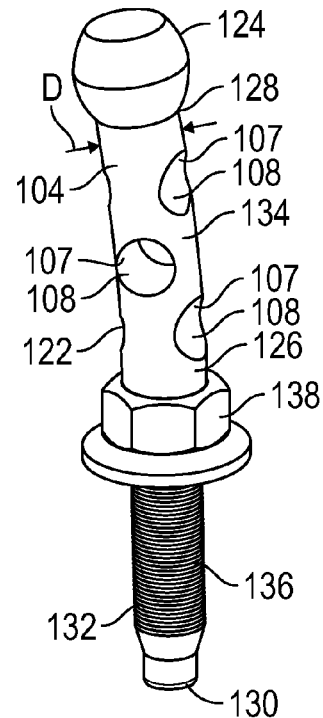
FIG. 7 is a perspective view of the stud shown in FIG. 6, wherein the stud is subjected to an external force and is in a deformed state.

With reference to FIGS. 6 and 7, the stud 104 is wholly or partly made of a metallic material and can deform (e.g., bend) when energy is transferred from the boss 106 to the stud 104 through the polymeric isolator 102. The stud 104 includes a shank 122 and a head 124. In the depicted embodiment, the head 124 has a substantially spherical shape to facilitate insertion to, and coupling to, the polymeric isolator 102. Thus, the head 124 may be referred to as a ball. The second cavity portion 114 (FIG. 4) of the polymeric isolator 102 is configured, shaped, and sized to receive the head 124 in order to couple the stud 104 to the polymeric isolator 102.

The shank 122 includes a shank body 126 having a first shank end 128 and a second shank end 130 opposite the first shank end 128. The head 124 is directly coupled to the first shank end 128 of the shank body 126. The shank body 126 includes a threaded portion 132 and a bendable portion 134 coupled to the threaded portion 132. The threaded portion 132 includes external threads 136 formed on the shank body 126 in order to couple the stud 104 to the underhood propulsion system 14 (FIG. 2). To facilitate the connection between the underhood propulsion system 14 (FIG. 2) and the stud 104, the threaded portion 132 is closer to the second shank end 130 than to the first shank end 128 of the shank body 126.

Figure 5:
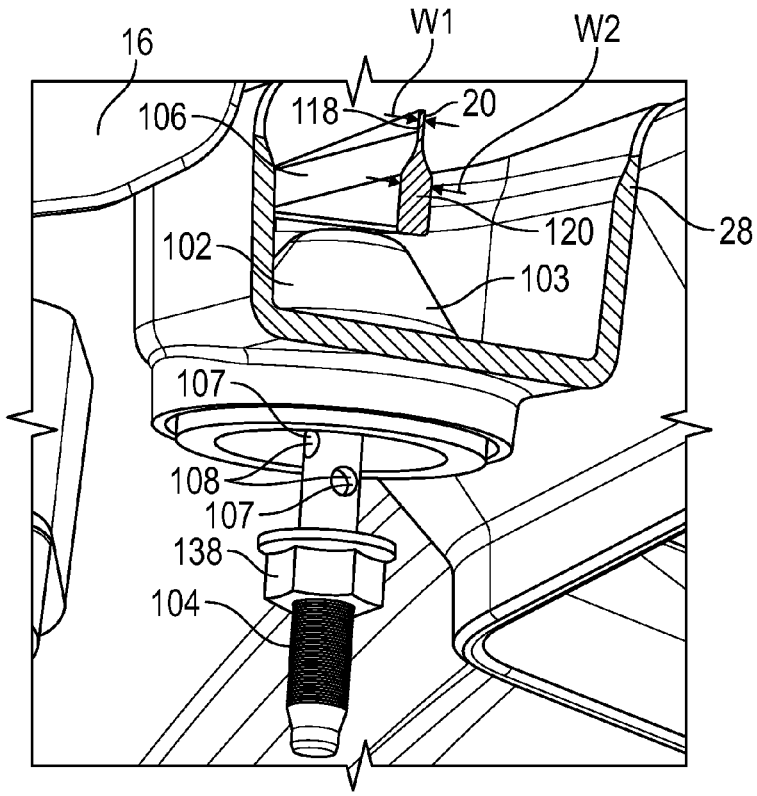
FIG. 5 is a partially cross-sectional perspective view of the stud assembly shown in FIG. 3.

The stud 104 further includes a nut 138 disposed between the threaded portion 132 and the bendable portion 134 of the shank body 126. In the depicted embodiment, the nut 138 is integrally coupled to the shank 122 so as to form a one-piece structure, thereby minimizing costs. A tool (e.g., driver) can engage the nut 138 to thread (or otherwise connect) the stud 104 to the underhood propulsion system 14. For this reason, the nut 138 is closer to the second shank end 130 than to the first shank end 128 of the shank body 126. As shown in FIGS. 5 and 6, the nut 138 may be disposed in different orientations relative to the head 124.

Figure 3:
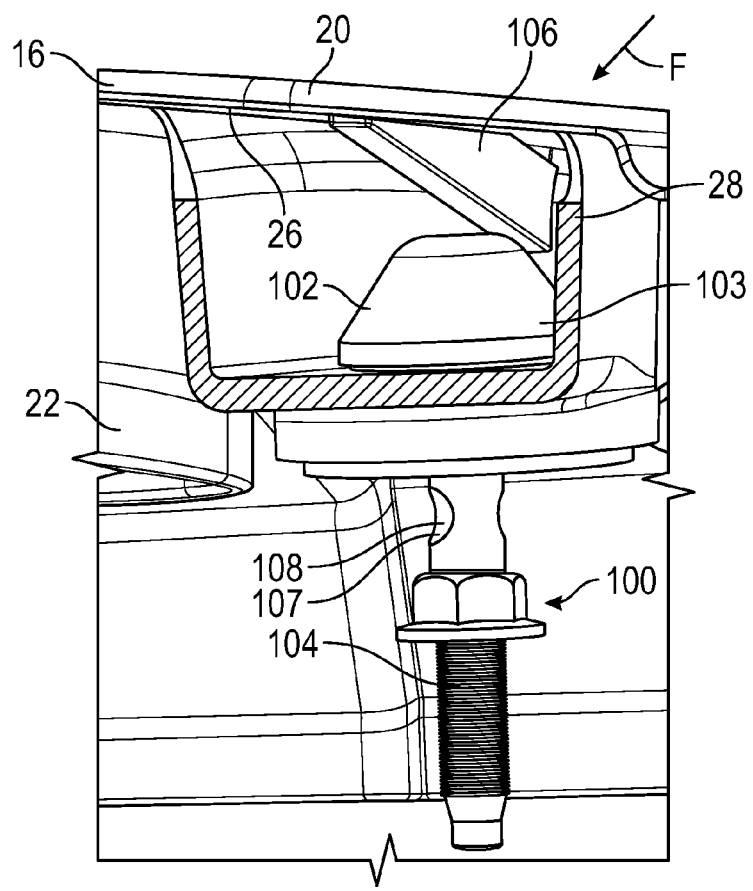
FIG. 3 is a partially cross-sectional perspective view of a stud assembly coupled to the underhood cover shown in FIG. 1.
Figure 4:
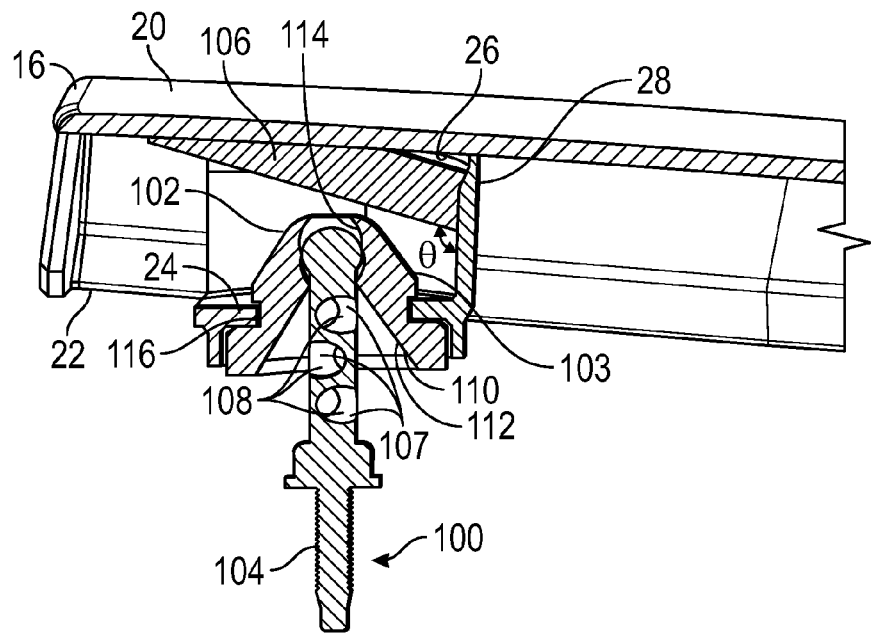
FIG. 4 is a cross-sectional side view of the stud assembly shown in FIG. 3.

The stud 104 includes at least one bending initiator feature 107 to facilitate deformation and fracture of the stud 104 when the underhood cover 16 is subjected to the external force F (FIG. 3). As non-limiting examples, the bending initiator feature 107 may be holes, stress risers, recesses, the notches, or any other structural feature capable of facilitating deformation and/or fracture of the stud 104 when the underhood cover 16 is subjected to the external force F (FIG. 3). In the depicted embodiment, for example, the stud 104 includes at least one perforation 108 extending through the bendable portion 134 of the shank body 126 to facilitate deformation and fracture of the stud 104 when the underhood cover 16 is subjected to the external force F (FIG. 3). In the depicted embodiment, the stud 104 includes a plurality of perforations 108. Each perforation 108 extends through the entire diameter D of the shank body 126 to facilitate deformation and fracture. Further, in the depicted embodiment, each of the perforations 108 has a different orientation with respect to one another in order to facilitate deformation of the stud 104 regardless of the specific orientation of the external force F relative to the underhood cover 16. When the underhood cover 16 receives the external force F, the perforations 108 serve as bending or fracture initiators. The size and number of perforations 108 can be tuned to the specific application.

With reference again to FIGS. 1-7, when the external force F is applied to hood of the vehicle 10, the hood of the vehicle 10 deflects and causes the underhood cover 16 to deflect as well. The deflection of the underhood cover 16 causes the boss 106 to move toward the polymeric isolator 102. Then, the boss 106 eventually contacts the top of the polymeric isolator 102 and pushes the polymeric isolator 102. As a consequence, the polymeric isolator 102 exerts pressure on the stud 104, causing the bendable portion 134 of the stud 104 to bend and possibly fracture at a location near the perforations 108. The deformation and fracture of the stud 104 allows the stud assembly 100 to absorb at least some of the energy from the external force F.

While the best modes for carrying out the teachings have been described in detail, those familiar with the art to which this disclosure relates will recognize various alternative designs and embodiments for practicing the teachings within the scope of the appended claims.

The invention claimed is:

1. A propulsion assembly, comprising:
   an underhood propulsion system;
   an underhood cover coupled over the underhood propulsion system;
   a stud assembly coupled between the underhood propulsion system and the underhood cover, wherein the stud assembly includes:
      a polymeric isolator;
      a stud coupled to the polymeric isolator, wherein the stud includes a shank and a head coupled to the shank, and the head is coupled to the polymeric isolator;
      a boss coupled to the underhood cover and disposed adjacent the polymeric isolator in order to allow energy transfer from the underhood cover to the polymeric isolator through the boss when the underhood cover is subjected to an external force; and
      wherein the shank includes at least one bending initiator feature in order to allow the shank to bend when the underhood cover is subjected to the external force.

2. The propulsion assembly of claim 1, wherein the shank includes a shank body, the shank body has a diameter, and the at least one bending initiator feature includes at least one perforation extending through an entirety of the diameter of the shank body.

3. The propulsion assembly of claim 2, wherein the underhood cover includes an inner cover cavity, and the polymeric isolator is partly disposed in the inner cover cavity.

4. The propulsion assembly of claim 3, wherein the boss is disposed in the inner cover cavity.

5. The propulsion assembly of claim 4, wherein the boss is shaped as a knife blade.

6. The propulsion assembly of claim 5, wherein the underhood cover further includes a first panel and a support wall directly connected to the first panel, and the boss is directly connected to the support wall and the first panel.

7. The propulsion assembly of claim 6, wherein the boss is obliquely angled relative to the support wall.

8. The propulsion assembly of claim 7, wherein the boss defines an oblique angle relative to the support wall, and the oblique angle is about 127 degrees.

9. The propulsion assembly of claim 8, wherein the underhood cover includes at least one snap-fit protrusion extending from the support wall, and the polymeric isolator includes an isolator body and defines a snap-fit recess extending into the isolator body, and the snap-fit recess is sized to receive the snap-fit protrusion in order to couple the polymeric isolator to the underhood cover.

10. The propulsion assembly of claim 9, wherein the stud includes a nut integrally coupled to the shank.

11. The propulsion assembly of claim 10, wherein the shank body includes a threaded portion and a bendable portion, the threaded portion includes external threads formed on the shank body, the bendable portion includes the at least one bending initiator feature, and the nut is disposed between the threaded portion and the bendable portion.

12. The propulsion assembly of claim 11, wherein the head has a spherical shape, the polymeric isolator includes an inner isolator cavity sized to receive the head, and the head is disposed in the inner isolator cavity in order to couple the stud to the polymeric isolator.

13. The propulsion assembly of claim 12, wherein the isolator body has a substantially frustoconical shape in order to facilitate energy transfer from the boss to the polymeric isolator when the underhood cover is subjected to the external force.

14. The propulsion assembly of claim 13, wherein the underhood propulsion system has a top surface, the stud is directly coupled to the underhood propulsion system, and the stud protrudes away from the top surface.

* * * * *